United States Patent [19]

Enomoto et al.

[11] Patent Number: 5,148,539
[45] Date of Patent: Sep. 15, 1992

[54] ADDRESS BUS CONTROL APPARATUS

[75] Inventors: Hiromichi Enomoto, Hadano; Kazushi Kobayashi, Ebina; Masami Jikihara, Yamato; Norihisa Amako, Hadano, all of Japan

[73] Assignee: Hitachi, Ltd., Tokyo, Japan

[21] Appl. No.: 711,254

[22] Filed: Jun. 4, 1991

Related U.S. Application Data

[63] Continuation of Ser. No. 256,402, Oct. 11, 1988, abandoned.

[30] Foreign Application Priority Data

Oct. 16, 1987 [JP] Japan ............... 62-259585
Feb. 24, 1988 [JP] Japan ............... 63-41753

[51] Int. Cl.⁵ .......................... G06F 12/00
[52] U.S. Cl. ................. 395/425; 364/DIG. 1; 364/240; 364/240.3; 364/245.6; 364/247; 364/242.2; 364/254.9; 364/255.1; 364/255.4
[58] Field of Search ... 364/200 MS File, 900 MS File, 364/240.3, DIG. 1, DIG. 2; 395/400, 425

[56] References Cited

U.S. PATENT DOCUMENTS

| | | | |
|---|---|---|---|
| 4,205,373 | 5/1980 | Shah et al. | 364/200 |
| 4,296,464 | 10/1981 | Wood et al. | 364/200 |
| 4,309,754 | 1/1982 | Dinwiddie, Jr. | 364/200 |
| 4,315,308 | 2/1982 | Jackson | 364/200 |
| 4,374,410 | 2/1983 | Sakai et al. | 364/200 |
| 4,393,501 | 7/1983 | Kellogg et al. | 364/200 |
| 4,467,447 | 8/1984 | Takahashi et al. | 364/900 |
| 4,471,458 | 9/1984 | Weilbacker et al. | 364/900 |
| 4,598,359 | 7/1986 | Boothroyd et al. | 364/200 |
| 4,602,330 | 7/1986 | Ikea | 364/200 |
| 4,608,631 | 8/1986 | Stiffler et al. | 364/200 |
| 4,633,437 | 12/1986 | Mothersole et al. | 364/900 |
| 4,683,534 | 7/1987 | Tietjen et al. | 364/200 |
| 4,766,538 | 8/1988 | Miyoshi | 395/325 |
| 4,769,781 | 9/1988 | Shirota et al. | 364/900 |
| 4,831,514 | 5/1989 | Turlakov et al. | 364/200 |
| 4,965,723 | 10/1990 | Kirk et al. | 364/200 |
| 4,996,469 | 10/1981 | Gunter et al. | 364/200 |
| 5,014,186 | 5/1991 | Chisholm | 364/200 |

FOREIGN PATENT DOCUMENTS 0194696 9/1986 European Pat. Off. .
2921419 12/1979 Fed. Rep. of Germany .
1136144 6/1986 Japan .

OTHER PUBLICATIONS

British Search Report from British Application No. 8824168.2.

Primary Examiner—Michael R. Fleming
Assistant Examiner—Ayaz R. Sheikh
Attorney, Agent, or Firm—Fay, Sharpe, Beall, Fagan, Minnich & McKee

[57] ABSTRACT

An address bus control apparatus links a memory bus connected with a CPU and a memory unit and a system bus connected with input/output units. The address bus width of the system bus is smaller than that of the memory bus and one of the input/output units is a master unit using address data of a smaller width than the address bus width of the system bus for accessing another unit. The address bus control apparatus, when bus identifying information from a master unit identifies the memory bus, delivers first complementary address data together with address data from the master unit onto the memory bus and, when the bus identifying information identifies the system bus, delivers second complementary address data onto the system bus, and thereby secures necessary address data width for each bus.

12 Claims, 7 Drawing Sheets

ADDRESS BUS CONTROL APPARATUS

This is a continuation of co-pending application Ser. No. 256,402 filed on Oct. 11, 1988, now abandoned.

BACKGROUND OF THE INVENTION

The present invention relates to control of buses in a data processing system and more particularly to an address bus control apparatus facilitating accessing between units using address data of different widths or lengths.

A data processing system with multi-buses, organized with a microprocessor in the center, frequently includes a bus (memory bus) connecting the microprocessor and a memory, a bus (system bus) interconnecting input/output units, and driver gates or buffer gates disposed between these buses. For example, a system as disclosed in Japanese Laid-open Patent Publication No. 60-235268 includes an internal bus connected with the CPU and an external bus connected with external input/output units, and address bus buffers and data bus buffers connecting these buses. Both these buses have the same address bus width, that is, the same number of address bits transmitted over the address bus. The most significant bit of the address data issued by the CPU onto the internal bus indicates which bus is to be accessed. There is provided a bank setting address switch or register, which delivers one address bit substituting for the most significant address bit used as the bus selecting information to be placed onto the address bus of the external bus, whereby the address space accessible through the buses is expanded.

With an increase in the word length of the microprocessor and improvement in its performance, the width (number of bits) of the address data, that is, the size of the address space handled thereby is expanded. Recently, a microprocessor capable of handling a 32-bit address, an address space of 4 GB, has become available. Such an expanded address space is too large for ordinary input/output units. Hence, it is desired that the address bus width of the system bus with which input/output units are connected is made smaller than the address bus width of the memory bus with which the CPU and the memory are connected, for example, 28 bits (256 MB).

Among input/output units that are desired to be connected to a system bus, there are those developed for use with old-type microprocessors having different sizes of address space, and therefore, there may be included such input/output units as will use address data of a still smaller width than the aforementioned reduced address bus width of the system bus.

In a system wherein such units using different address data widths are connected with two buses having address buses of different widths, there arises a problem of mismatching of the address data widths. Generally, when there is a mismatch between address data widths, it becomes impossible to carry out correct addressing. Where the address bus width of a bus is larger than the address data width of a unit connected to that bus, it may be possible to provide a register for supplying the address bits to make up for the difference therebetween, thereby compensating for a mismatch between address data widths of units connected to a single bus and using different address data widths. However, in a system wherein such units are connected to two buses of different address data widths, i.e., the memory bus and the system bus, there arises an additional problem of a mismatch between the address bus widths of these buses. Thus, it becomes difficult to achieve efficient control of DMA (direct memory access) from any unit connected with any bus to any other unit connected with any bus. What is demanded in particular is to make it possible that a unit which is connected to the system bus having the smaller address bus width and which uses address data of a still smaller width than the address bus width of the system bus can dynamically and quickly select any of the units connected to either of the system bus and the memory bus, as the object unit of DMA.

Accordingly, an object of the present invention is to provide an address bus control apparatus capable of efficiently controlling accesses between units using different address data widths and connected with buses of different address bus widths.

Another object of the present invention is to provide an address bus control apparatus whereby a unit connected with one of the two buses having the smaller address bus width and using address data of a still smaller width than the address bus width of this bus can dynamically and quickly select any of the units connected to either the same bus or the other bus having the larger address bus width.

SUMMARY OF THE INVENTION

The address bus control apparatus according to the present invention is arranged to supply first address data for compensating for a mismatch between the address bus width of a first bus (e.g., memory bus) and the address data width of an accessing unit connected with a second bus (e.g., system bus), the address bus width of the second bus being smaller than that of the first bus. The first address data is delivered onto the first bus when bus identifying information from the accessing unit identifies the first bus.

Where the address data width of the accessing unit is still smaller than the address bus width of the second bus, the address bus control apparatus is arranged further to supply second address data for compensating for a mismatch between the address bus width of the second bus and the address data width of the accessing unit. The second address data is delivered onto the second bus when the bus identifying information identifies the second bus.

In a system including a plurality of accessing units using different address data widths, the address data width of the unit which has issued an access request is decided according to the access request signal, and appropriate compensation for the mismatch between the address data widths is performed depending on that decision.

Hence, the DMA operation between the units using different address data widths and connected with the first bus and the second bus having different address bus widths is controlled efficiently. Thus, efficient cooperation, for example, between a new processor having an expanded address space and old-type input/output units having smaller address spaces than that expanded address space can be realized easily.

DETAILED DESCRIPTION OF THE PREFERRED EMBODIMENTS

Figure 1:
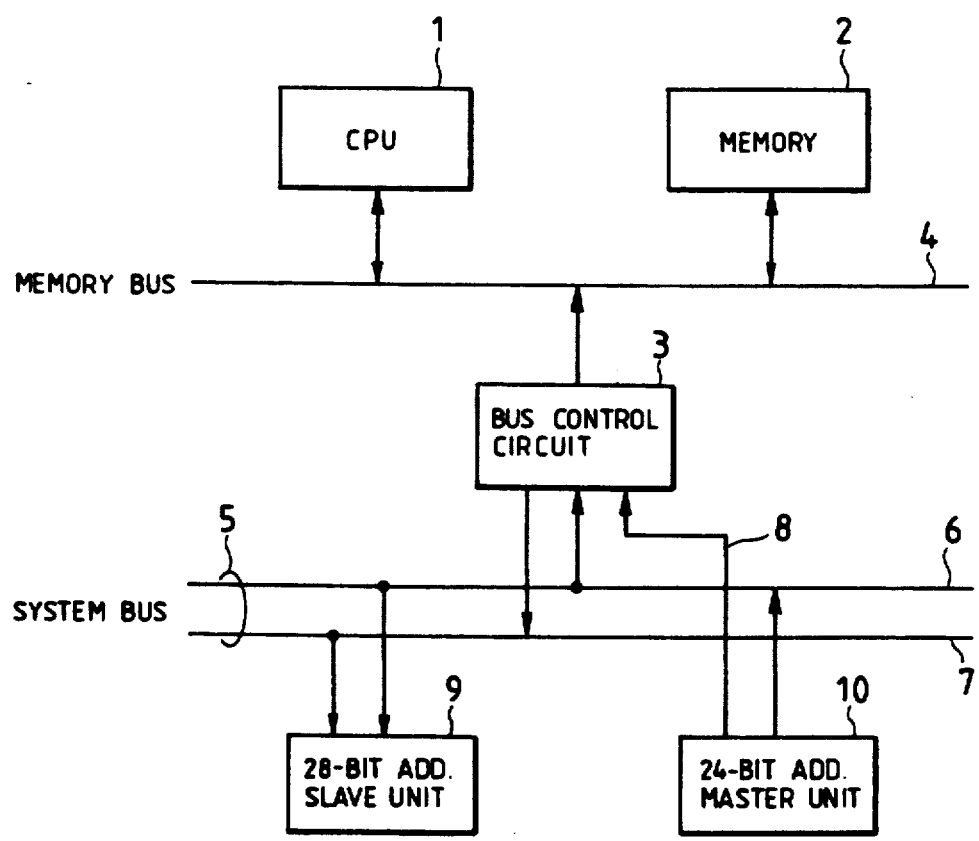
FIG. 1 shows, in the form of block diagram, a data processing system including a first embodiment of the present invention.

FIG. 1 shows a data processing system including an embodiment of the present invention. A CPU 1 and a memory 2 using a 32-bit address are connected with a memory bus 4 adapted for a 32-bit address and this memory bus 4 is coupled through a bus control circuit 3 with a system bus 5 adapted for a 28-bit address. The system bus 5 includes a low-order address bus 6 for the low-order 23 bits of the 28-bit address and an upper-order address bus 7 for the remaining high-order five bits. A slave unit (an input/output unit having no access requesting function) 9 using a 28-bit address is connected with both the low-order address bus 6 and the high-order address bus 7. A master unit (an input/output unit having an access requesting function) 10 using a 24-bit address is connected only with the low-order address bus 6. The master unit 10 delivers low-order 23 bits of the 24-bit address data onto the low-order address bus 6 and delivers its most significant bit to the bus control circuit 3 as a path control signal 8.

Figure 2:
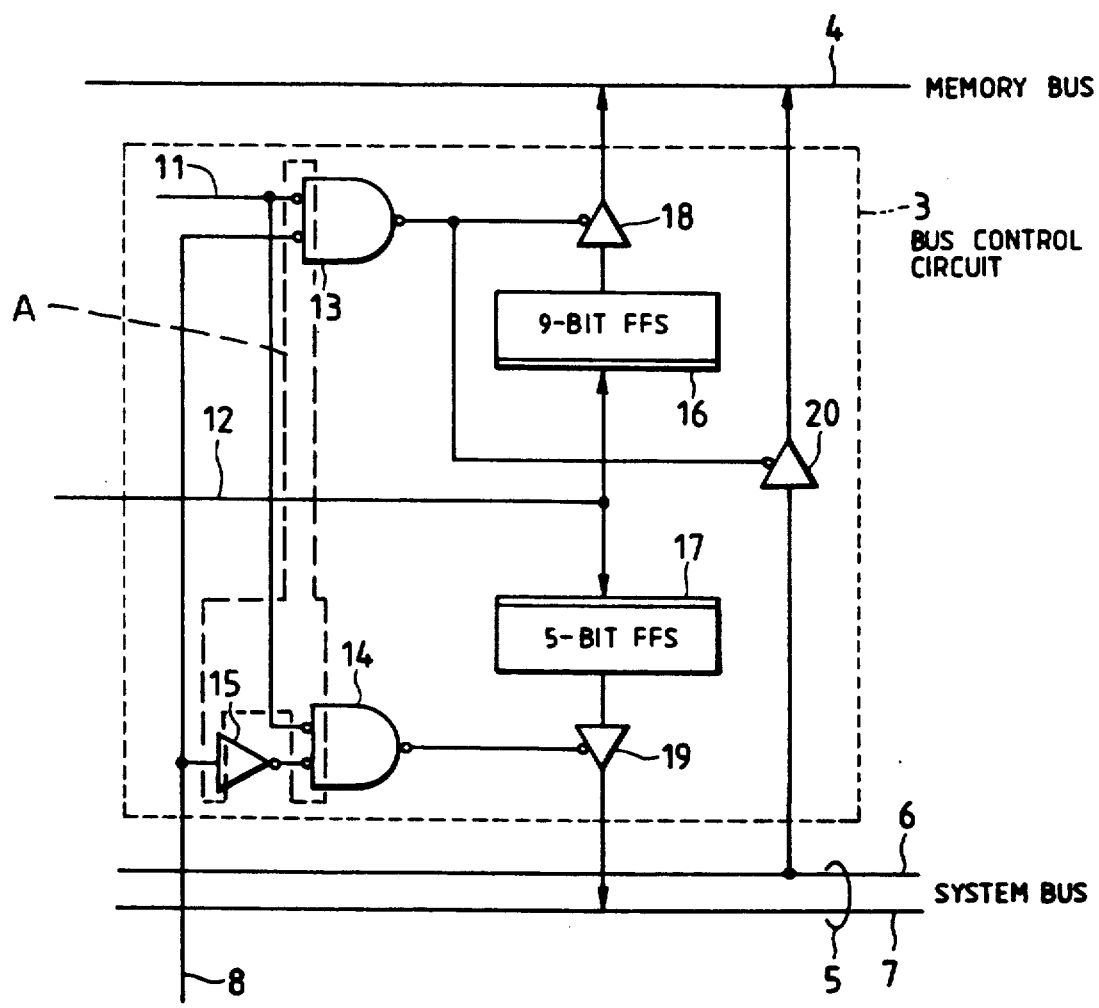
FIG. 2 shows, in the form of logical circuit diagram, a bus control circuit of the first embodiment in FIG. 1.

FIG. 2 shows details of the bus control circuit 3 in FIG. 1. The path control signal 8 from the master unit 10 is applied to a first input of an AND (negative) gate 13 directly and applied to a first input of an AND (negative) gate 14 through a NOT gate 15. The input terminals of the AND gate 13 and the NOT gate 15 comprising a signal receiving means A. Second inputs of the AND gates 13 and 14 receive an enable signal 11 taking a logical value "0" when activated. Output from the AND gate 13 enables a driver gate 18 to deliver therethrough the contents of a flip-flop group 16 onto the memory bus 4. Output from the AND gate 14 enables a driver gate 19 to deliver therethrough the contents of a flip-flop group 17 onto the high-order address bus 7 of the system bus 5. The output from the AND gate 13 also enables a driver gate 20 to transfer therethrough data on the low-order address bus 6 of the system bus 5 to the corresponding portion of the memory bus 4. The AND gates 13 and 14, the NOT gate 15, and the driver gates 18, 19, and 20 comprising address information transmitting means. The flip-flop group 16 stores 9-bit-wide complementary address data to be added to the address data transferred from the system bus 5 to the memory bus 4, and the flip-flop group 17 stores 5-bit-wide complementary address data to be delivered onto the high-order address bus 7 for complementing the address data on the low-order address bus 6. The contents of these flip-flop groups are set by the CPU 1 during DMA initialization to desired values through a signal line 12 connected to a data bus of the CPU 1.

Figure 6:
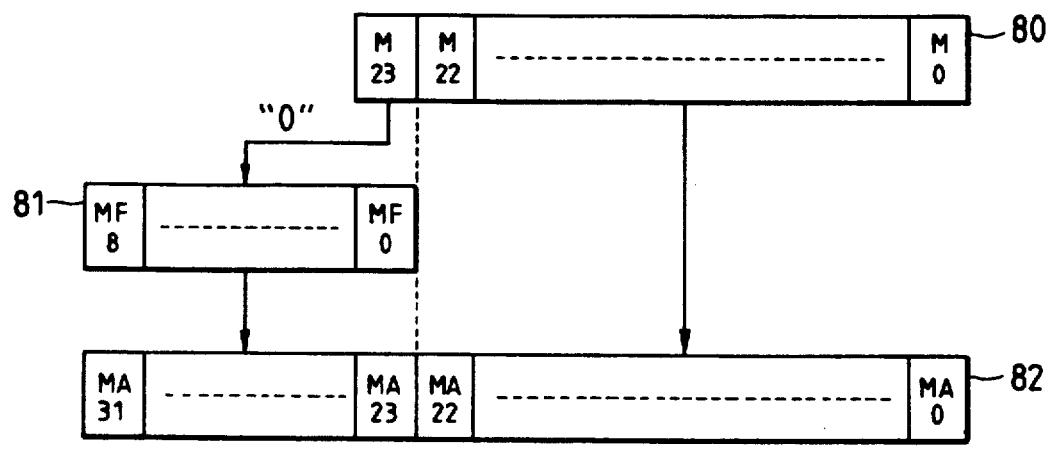
FIG. 6 to FIG. 8 diagrammatically show processing of address data performed by the first and second embodiments.

First, operation in the DMA from the master unit 10 to the memory 2 will be described. FIG. 6 diagrammatically shows address data processing in this instance. The 24-bit address data 80 delivered from the master unit 10 is composed of bits M0 to M23. The most significant bit M23 thereof is used as the path control signal 8, which is set to logical "0" when access to the memory 2 is requested. The data 81 in the flip-flop group 16 is composed of bits MF0 to MF8 and this data identifies a predetermined area in the address space of the address bus 6. This data is added to the bits M0 to M22 on the low-order address bus 6, whereby 32-bit address data 82 composed of bits MA0 to MA31 is provided and transmitted over the memory bus 4.

With reference to FIG. 1, FIG. 2, and FIG. 6, when the path control signal 8 (M23) from the master unit 10 is logical "0", the enable signal 11, passing through the AND gate 13, enables the driver gate 18 and allows the nine bits from MF0 to MF8 in the flip-flop group 16 to be transferred to the high-order 9-bit positions of the memory bus 4. The enable signal 11, passing through the AND gate 13, enables also the driver gate 20 and allows the 23 bits from M0 to M22 on the low-order address bus 6 to be transferred to the low-order 23-bit positions of the memory bus 4. In the described manner, the master unit 10 using a 24-bit address is able to carry out addressing of the memory 2 through the memory bus 4 adapted for 32-bit address (MA0 to MA31) and thereby to achieve data transfer by the DMA.

Figure 7:
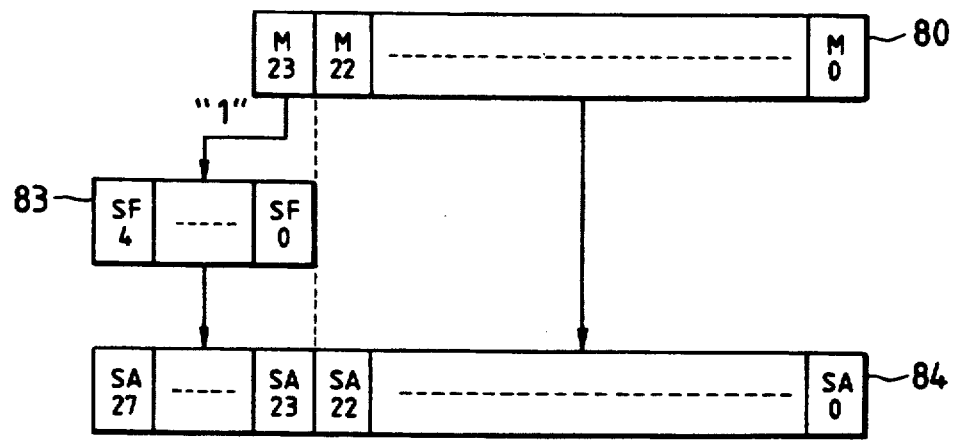

Now, operation in the DMA from the master unit 10 to the slave unit 9 will be described. FIG. 7 diagrammatically shows address data processing in this instance. When access to the slave unit 9 is requested, the most significant bit M23 of the 24-bit address data 80 issued from the master unit 10 is set to logical "1". The data 83 in the flip-flop group 17 is composed of bits SF0 to SF4 and this data identifies a predetermined area in the address space of the system bus 5. This data is delivered onto the high-order address bus 7 and coupled with the bits M0 to M22 on the low-order address bus 6, whereby 28-bit address data 84 composed of bits SA0 to SA27 is provided.

With reference to FIG. 1, FIG. 2, and FIG. 7, when the path control signal 8 (M23) from the master unit 10 is logical "1", the enable signal 11 passes through the AND gate 14 to enable the driver gate 19 and thereby allow the five bits from SF0 to SF4 in the flip-flop group 17 to be delivered onto the high-order address bus 7. In the described manner, the master unit 10 using 24-bit address is able to carry out addressing of the slave unit 9 through the system bus 5 adapted for 28-bit address (SA0 to SA27) and thereby to achieve data transfer by the DMA.

Figure 3:
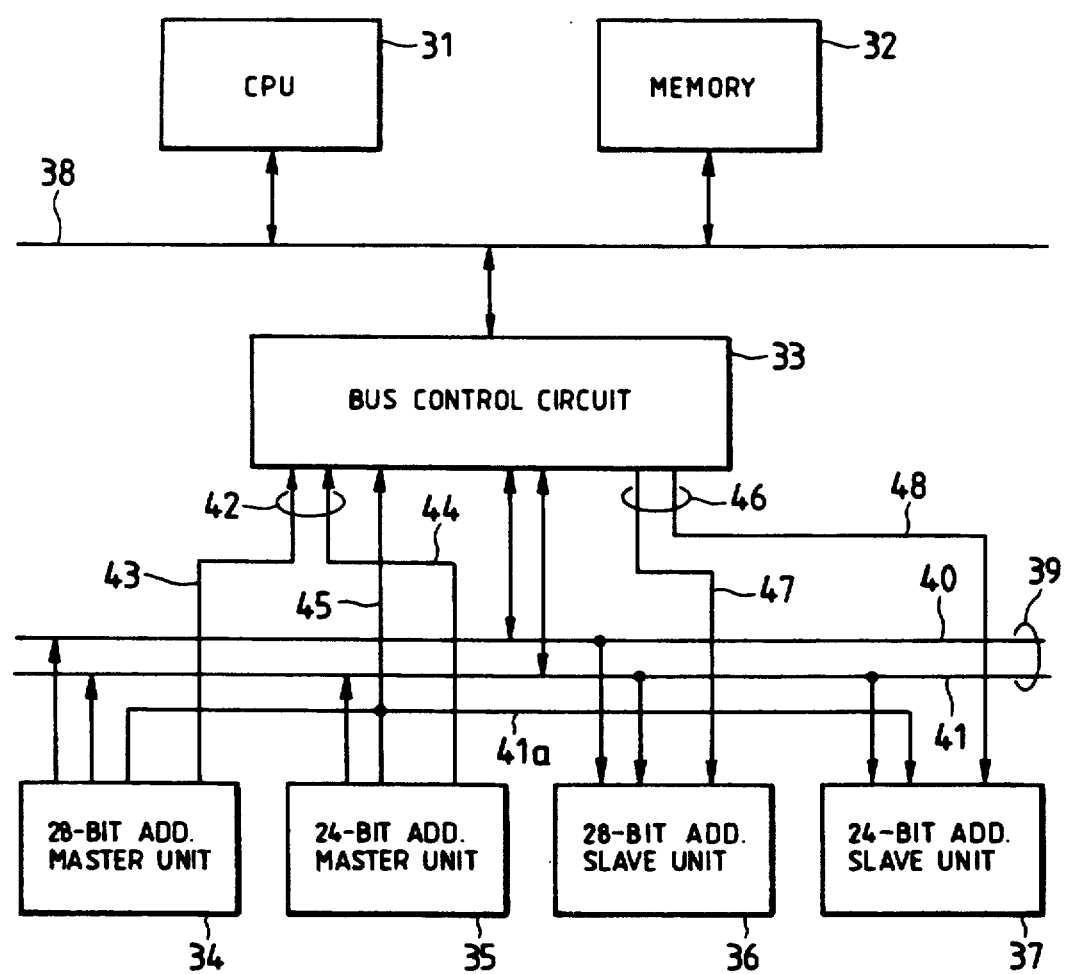
FIG. 3 shows, in the form of block diagram, a data processing system including a second embodiment of the present invention.

FIG. 3 shows a data processing system including another embodiment, a generalized version of the above described embodiment, of the present invention. A CPU 31 and a memory 32 using a 32-bit address are connected with a memory bus 38 for a 32-bit address, and the memory bus 38 is coupled with a system bus 39 for a 28-bit address through a bus control circuit 33. The system bus 39 includes a high-order address bus 40 for a high-order five bits of the 28-bit address and a low-order address bus 41 for the remaining 23 bits. A master unit 34 and a slave unit 36 both using a 28-bit address are connected with both the high-order address bus 40 and the low-order address bus 41, and a master unit 35 and a slave unit 37 both using a 24-bit address are connected only with the low-order address bus 41.

The master unit 35 transmits the low-order 23 bits of the 24-bit address data over the low-order address bus 41 and delivers the most significant bit thereof, as a path control signal 45, to the bus control circuit 33 and, as the most significant address bit, to the slave unit 37 through a signal line 41a. The master unit 34 also delivers the 24th bit of the address data to the slave unit 37 through the signal line 41a as well as onto the high-order address bus 40. DMA request signal lines 42 which are led into the bus control circuit 33 serve to convey a 28-bit address DMA request signal 43 indicating a DMA request from the 28-bit address master unit 34 and a 24-bit address DMA request signal 44 indicating a DMA request from the 24-bit address master unit 35. Access control lines 46 which are led out of the bus control circuit 33 serve to convey a 28-bit address access control signal 47 to the slave unit 36 and a 24-bit address access control signal 48 to the slave unit 37.

Figure 4:
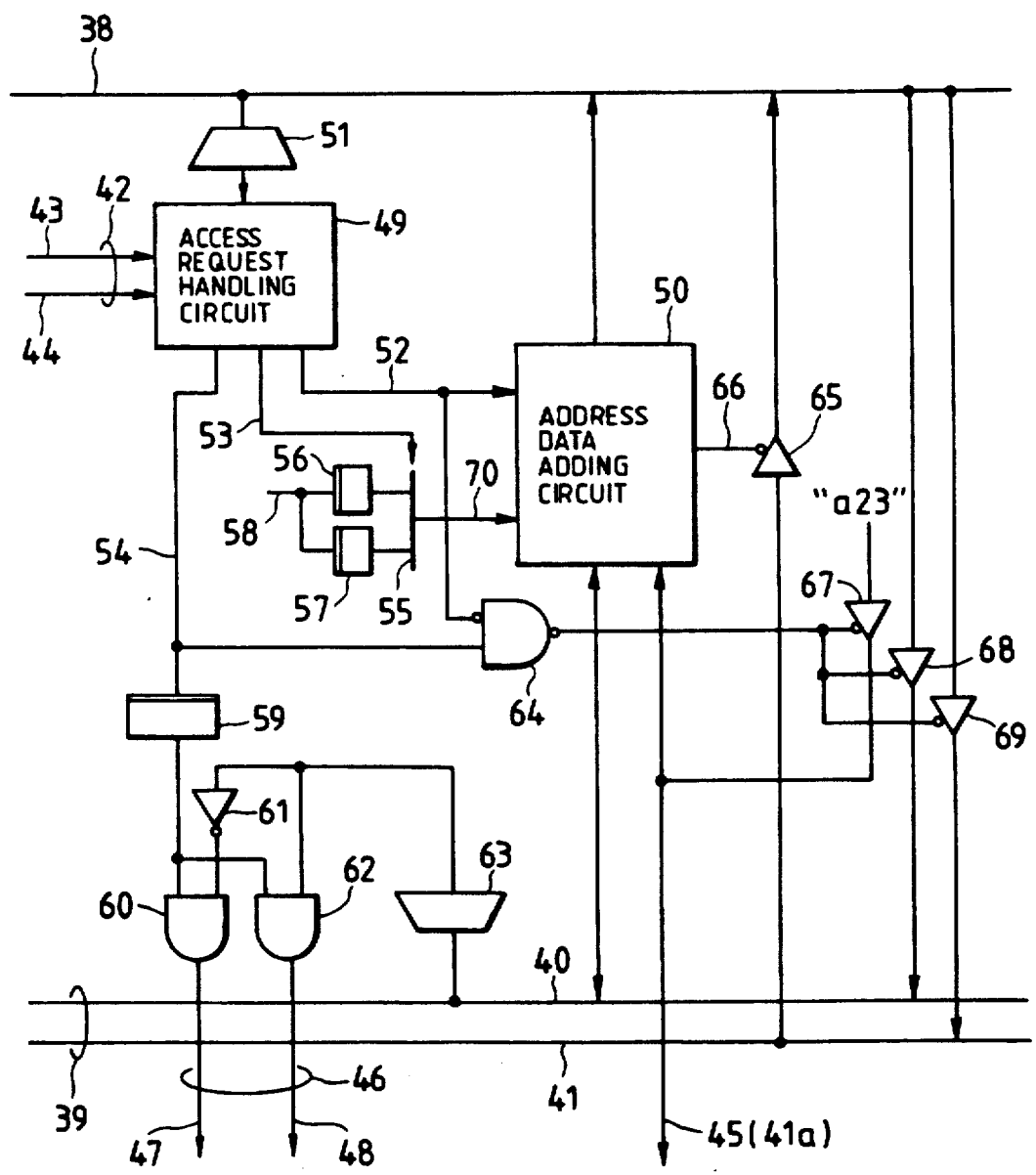
FIG. 4 shows, partly in the form of logical circuit diagram and partly in the form of block diagram, a bus control circuit of the second embodiment in FIG. 3.

FIG. 4 shows details of the bus control circuit 33 in FIG. 3. An access request handling circuit 49 receives output of a decoder 51 which detects that the address data on the memory bus 38 identifies the slave unit 36 or 37 connected with the system bus, the 28-bit address DMA request signal 43, and the 24-bit address DMA request signal 44, and generates a DMA permit signal 52, a DMA request control signal 53, and an access path control signal 54. The DMA request control signal 53 controls a selector 55 and thereby selects output of a flip-flop 56 or a flip-flop 57. The flip-flop 56 indicates a request from the 28-bit address master unit, and the flip-flop 57 indicates a request from the 24-bit address master unit. The access request handling circuit 49, flip-flops 56 and 57, and selector 55 comprising a signal generating means to generate output 70. Hence, output 70 from the selector 55 indicates the address data width of the master unit whose DMA request is accepted. The states of these flip-flops are set by the CPU 31 through a data line 58. The DMA permit signal 52 and the output 70 of the selector 55 are supplied to an address data adding circuit 50.

The access path control signal 54 is applied through a timing adjusting flip flop 59 to first inputs of AND gates 60 and 62. A second input of the AND gate 60 is supplied with output from a decoder 63 through a NOT gate 61, and a second input of the AND gate 62 is supplied with the output from the decoder 63 directly. The decoder 63 detects that the address data on the high-order address bus 40 of the system bus 39 identifies the 24-bit address slave unit 37. The AND gate 60 generates the 28-bit address access control signal 47, and the AND gate 62 generates the 24-bit address access control signal 48.

The access path control signal 54, when permitted to pass through an inhibit gate 64, also enables driver gates 67 to 69. When enabled, the driver gate 69 transfers the first to 23rd address bits on the memory bus 38 to the low-order address bus 41 of the system bus, the driver gate 68 transfers the 24th to 28th address bits on the memory bus 38 to the high-order address bus 40, and the driver gate 67 transfers the 24th address bit (a23) to the signal line 41a. However, when the DMA permit signal 52 is logical "1", the enabling of these driver gates is inhibited.

The address data adding circuit 50 is connected also with the memory bus 38 and the high-order address bus 40, and further, receives the path control signal 45 from the 24-bit address master unit 35. As described in detail hereinafter, the address data adding circuit 50 delivers complementary address bits onto the memory bus 38 or the high-order address bus 40 of the system bus, and generates an enable signal 66 when the same delivers the complementary bits onto the memory bus 38. The enable signal 66 enables a driver gate 65 and allows the address data on the low-order address bus 41 of the system bus to be transferred to the corresponding positions of the memory bus 38.

Figure 5:
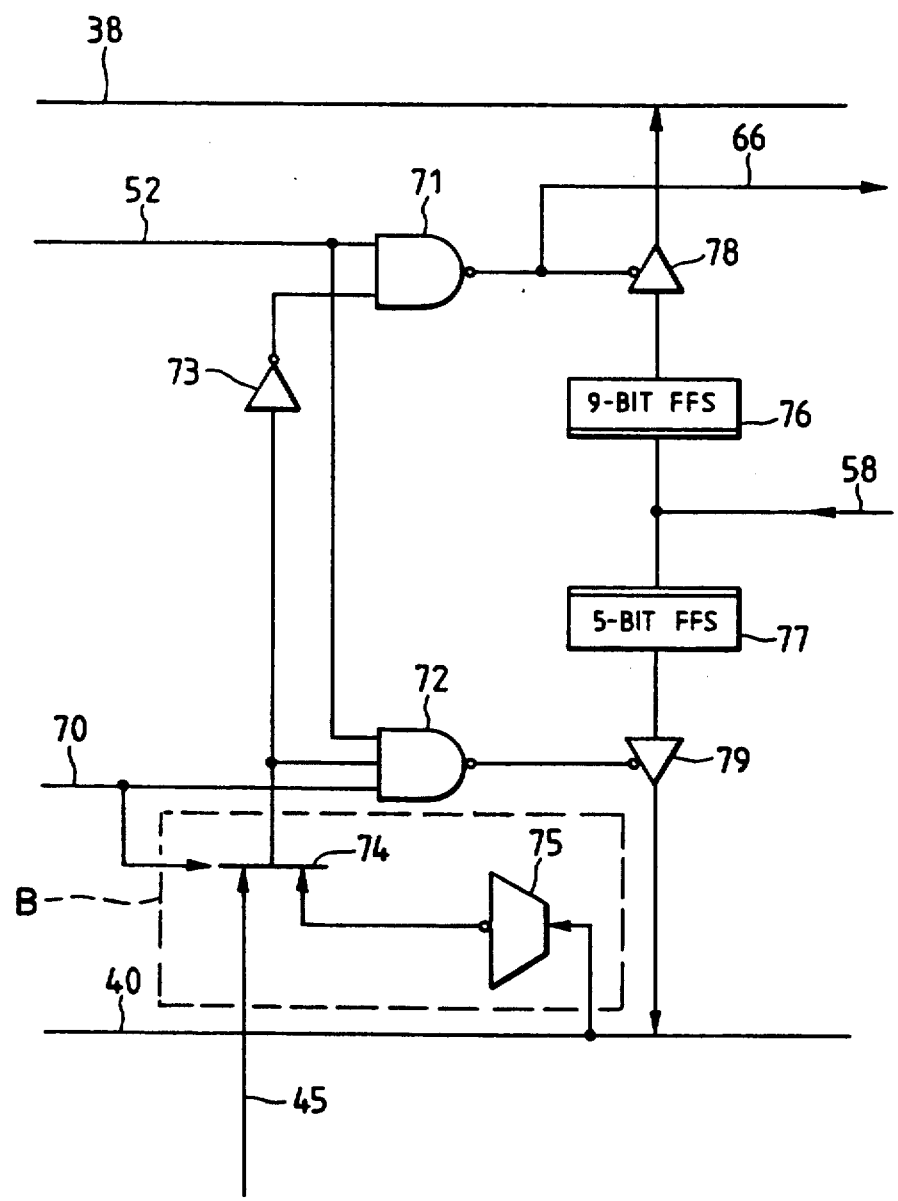
FIG. 5 shows, in the form of logical circuit diagram, an address data adding circuit in FIG. 4.

FIG. 5 shows details of the address data adding circuit 50. The DMA permit signal 52 from the access request handling circuit 49 is applied to first inputs of both NAND gates 71 and 72. Output from a selector 74 is applied to a second input of the NAND gate 71 through a NOT gate 73 and to a second input of the NAND gate 72 directly. The address data width signal 70 from the selector 55 in FIG. 4 is applied to a third input of the NAND gate 72 and also controls the selector 74. The selector 74 selects the path control signal 45 from the 24-bit address master unit 35 or output from a decoder 75. The decoder 75 detects that the address data on the high-order address bus 40 of the system bus identifies a DMA window space of the memory bus 38, i.e., the address range reserved for the DMA to the memory 32. The selector 74 and decoder 75 comprising a signal receiving means B.

Output from the NAND gate 71 enables a driver gate 78 so that the contents of a flip-flop group 76 are transmitted over the memory bus 38, while output from the NAND gate 72 enables a driver gate 79 so that the contents of a flip-flop group 77 are transmitted over the high-order address bus 40 of the system bus. The output from the NAND gate 71 is also delivered as the above-described enable signal 66. The flip-flop group 76 stores the 9-bit-wide complementary address data to be added to the address data transferred from the system bus 39 to the memory bus 38, and the flip-flop group 77 stores the 5-bit-wide complementary address data to be delivered onto the high-order address bus 40 for complementing the address data on the low-order address bus 41 of the system bus. The contents of these flip-flop groups are set to desired values by the CPU through the signal line 58 during the DMA initialization.

Operations of the apparatus shown in FIG. 3 to FIG. 5 will be described below. First, the case where the CPU 31 accesses the slave unit 36 or 37 will be described.

Referring to FIG. 3, the CPU 31 using a 32-bit address delivers 32-bit address data onto the memory bus 38. Then, the bus control circuit 33 establishes an access path to the 28-bit address slave unit 36 or the 24-bit address slave unit 37 through the address bus control operation as described below.

Now, with reference to FIG. 4, the decoder 51 decodes the 32-bit address data delivered by the CPU 31 onto the memory bus 38 and, when the decoded address identifies the slave unit 36 or 37, delivers the decoded output indicating that fact to the access request handling circuit 49. The access request handling circuit 49 examines whether or not there is any DMA request signal present on the DMA request signal lines 42, and when there is no DMA request signal, accepts the access request from the CPU 31 and generates only the access path control signal 54. Since the DMA permit signal 52 is not generated, the access path control signal 54 is supplied through the inhibit gate 64 to the driver gates 67, 68, and 69 and enables these driver gates. Thereby, the driver gate 68 transfers the 24th to 28th bits of the address data on the memory bus 38 to the high-order address bus 40 of the system bus 39. The driver gate 69 transfers the first to 23rd bits of the address data on the memory bus 38 to the low-order address bus 41 of the system bus 39. Further, the driver gate 67 transfers the 24th bit of the address data on the memory bus 38 to the 24th address signal line 41a so as to provide the 24-bit address slave unit 37 with the most significant address bit. The 5-bit address data output from the driver gate 68 to the high-order address bus 40 is decoded by the decoder 63. The decoder 63 decodes the address data on the high-order address bus 40 and, when it identifies the 24-bit address slave unit 37, outputs a signal of logical "1".

Meanwhile, the access path control signal 54 is sent to and retained by the flip-flop 59 so that the setup time is provided for the driver gates 67, 68, and 69 to output address data onto the system bus, and thereafter the signal 54 is sent to the AND gates 60 and 62. When the output from the decoder 63 is logical "1", the output of the flip-flop 59 passes through the AND gate 62 and is delivered as the 24-bit address access control signal 48 for selecting the 24-bit address slave unit 37. On the other hand, when the output from the decoder 63 is logical "0", the output of the NOT gate 61 becomes logical "1", and hence the output of the flip-flop 59 passes through the AND gate 60 and is delivered as the 28-bit address access control signal 47 for selecting the 28-bit address slave unit 36.

In the described manner, the bus control circuit 33 analyses the address data delivered from the CPU 31 and transfers the necessary portion of the address data on the memory bus 38 through the driver gates 67 to 69 to the system bus 39, and further, delivers the access control signal to the access-requested unit. Thus, the CPU 31 connected with the 32-bit address memory bus 38 and using 32-bit address is able to access the 28-bit address slave unit 36 or the 24-bit address slave unit 37.

Now, address bus controlling operation for the DMA of the 24-bit address master unit 35 connected with the system bus 39 will be described. The controlling operation in this case is basically the same as that in the apparatus of FIG. 1 and FIG. 2 and the illustration in FIG. 6 and FIG. 7 are applicable also to this case.

Description of the case of the DMA to the memory 32 connected with the memory bus 38 will first be described. With reference to FIG. 3, when the DMA to the memory 32 is necessary, the 24-bit address master unit 35 delivers the 24-bit address DMA request signal 44 to the bus control circuit 33, the low-order 23 bits (M0 to M22: the address data 80 in FIG. 6) to the low-order address bus 41, and the most significant bit (M23: the address data 80 in FIG. 6) of the address data to the bus control circuit 33 as the path control signal 45. The bit M23 is set to logical "0" when the DMA to the memory 32 is requested. Now reference is made to FIG. 4. Upon receipt of the 24-bit address DMA request signal 44, the access request handling circuit 49 generates, provided that there is no other access request, the DMA permit signal 52, the DMA request control signal 53, and the access path control signal 54. The DMA request control signal 53 becomes logical "1" when the 28-bit address DMA request signal 43 is detected and becomes logical "0" when the 24-bit address DMA request signal 44 is detected. Since, in the present case, the 24-bit address DMA request signal 44 is detected, the signal of logical "0" is supplied as the DMA request control signal 53 to the selector 55. In response to this signal of logical "0", the selector 55 selects the output of the flip-flop 57 previously set to logical "1" by the CPU 31. Hence, the address data width signal 70 sent from the selector 55 to the address data adding circuit 50 becomes logical "1", and it is thereby indicated that the address data width of the master unit issuing the DMA request is 24 bits.

Refer now to FIG. 5. In the address data adding circuit 50, the address data width signal 70 of logical "1" is applied to the selector 74 and the NAND gate 72. The selector 74, responding to the signal of logical "1", selects the side of the path control signal 45. When the master unit 35 accesses the DMA window of the memory bus 38, the path control signal 45 is logical "0" as described above. The logical "0" of the path control signal 45 is inverted by the NOT gate 73 to a logical "1" and applied to the NAND gate 71. The NAND gate 71 being supplied with the DMA permit signal 52 responds to the signal of logical "1" from the NOT gate 73 and outputs the enable signal 66 and also enables the driver gate 78. As a result, the 9-bit address data (MF0 to MF8: the complementary address data 81 in FIG. 6) previously stored into the flip-flop group 76 by the CPU 31 is delivered to the 24th to 32nd bit positions of the memory bus 38 and becomes the high-order nine bits (MA23 to MA31: the address data 82 in FIG. 6) of the address data on the memory bus 38.

Meanwhile, the enable signal 66 enables the driver gate 65, whereby 23-bit address data (M0 to M22: the address data 80 in FIG. 6) on the low-order address bus 41 is transferred to the first to 23rd bit positions on the memory bus 38 and becomes the low-order 23-bits (MA0 to MA22: the address data 82 in FIG. 6) of the address data on the memory bus 38. Thus, 32-bit-wide address data (MA0 to MA31: the address data 82 in FIG. 6) is formed on the memory bus 38.

In the described manner, the bus control circuit 33, responding to the indication by the path control signal 45, i.e., the most significant bit M23 of the 24-bit address from the 24-bit address master unit 35, couples the 23-bit address data M0 to M22 on the low-order address bus 41 with the 9-bit complementary address data MF0 to MF8 previously stored in the flip-flop group 76 and thereby forms the 32-bit address data MA0 to MA31 required for performing the DMA through the 32-bit address memory bus 38, and thus, data transfer by the DMA between the master unit 35 and the memory 32 is made possible.

Now, address bus control operation for the DMA from the 24-bit address master unit 35 to the 28-bit address slave unit 36 connected with the system bus 39 will be described. With reference to FIG. 3, when it becomes necessary to perform the DMA to the 28-bit address slave unit 36 connected with the system bus 39, the 24-bit address master unit 35 delivers a DMA request signal 44 to the bus control circuit 33, delivers low-order 23 bits (M0 to M22: FIG. 6) of address data onto the low-order address bus 41, and delivers the most significant bit (M23: FIG. 6) to the bus control circuit 33 as the path control signal 45. Here, however, the bit M23 is set to logical "1" for achieving the DMA to the slave unit connected with the system bus 39.

With reference to FIG. 4 and FIG. 5, in the bus control circuit 33, the access request handling circuit 49, as in the DMA to the memory 32, generates the DMA permit signal 52, the DMA request control signal 53, and the access path control signal 54, and the address data adding circuit 50 receives the DMA permit signal 52 of logical "1" and the address data width signal 70 of logical "1". The path control signal 45 to be selected by the selector 74 in this case is logical "1". Hence, the output of the NOT gate 73 becomes logical "0" and the NAND gate 71 does not generate an enable signal. However, the NAND gate 72 receives the address data width signal 70 of logical "1", the DMA permit signal 52 of logical "1", and the path control signal 45 of logical "1" and enables the driver gate 79. As a result, the 5-bit complementary address data (SF0 to SF4: FIG. 7) previously stored by the CPU 31 into the flip-flop group 77 is delivered onto the high-order address bus 40. These five address bits are coupled with the 23-bit address data (M0 to M22: FIG. 7) on the low-order address bus 41 and thereby 28-bit address data (SA0 to SA27) is formed.

The decoder 63 decodes the address data thus delivered onto the high-order address bus 40 and generates a signal of logical "0". This is because the decoded address data does not identify the 24-bit address slave unit. Thus, the AND gate 60 receives, as an input thereto, a signal of logical "1" from the NOT gate 61, and, upon receipt of the access path control signal 54 from the flip-flop 59, generates the 28-bit address access control signal 47.

Thus, the 24-bit address master unit 35 is able to carry out addressing of the address space of the 28-bit address slave unit 36, and thereby, the DMA data transfer between these units is achieved.

In the case of the DMA from the 24-bit address master unit 35 to the 24-bit address slave unit 37, the contents of the flip-flop group 77 (SF0 to SF4: FIG. 7) are set to the value identifying the area in the address space of the system bus allotted to the 24-bit address slave unit 37. Operations of the bus control circuit 33 are the same as those in the case of the DMA to the 28-bit address slave unit 36 except operations of the decoder 63 and the AND gates 60 and 62. In this case of the DMA to the 24-bit address slave unit 37, the decoder 63 decodes the address data on the high-order address bus 40 identifying the 24-bit address slave unit 37 and generates its output of logical "1". Consequently, upon receipt of the access path control signal 54 from the flip-flop 59, the AND gate 62 generates the 24-bit address access control signal 48. The 24th address bit is delivered directly from the 24-bit address master unit 35 to the 24-bit address slave unit 37 through the signal line 41a.

Figure 8:
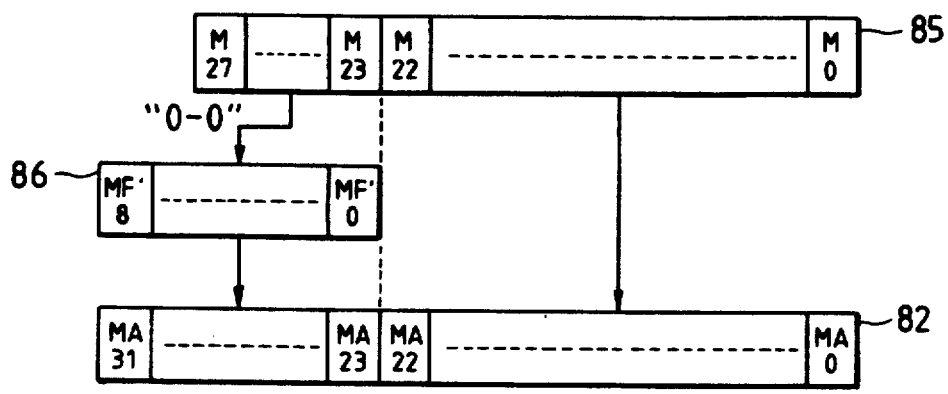

Address bus controlling operation for the DMA from the 28-bit address master unit 34 to the memory 32 connected with the memory bus 38 will now be described. FIG. 8 shows address data processing in this case. 28-bit address data 85 delivered by the 28-bit address master unit 34 is composed of bits M0 to M27, and high-order five bits thereof, M23 to M27, are all set to logical "0" when an access to the memory 32 is requested. Data 86 in the flip-flop group 76 is composed of bits MF'0 to MF'8, and this data identifies a predetermined area of the address space of the memory bus 38. This data is added to the bits M0 to M22 on the low-order address bus 41 and thereby 32bit address data 82 consisting of bits MA0 to MA31 is formed.

Reference is made to FIG. 3. The 28-bit address master unit 34 delivers the 28-bit address DMA request signal 43 to the bus control circuit 33 and the 28-bit address data (M0–M27: FIG. 8) onto the system bus 39. More particularly, it delivers the high-order 5-bit address data (M23 to M27) onto the high-order address bus 40 and the low-order 23-bit address data (M0 to M22) onto the low-order address bus 41.

Reference is now made to FIG. 4. In the bus control circuit 33, the access request handling circuit 49 receives the 28-bit address DMA request signal 43 and, if there is no other access request, generates the DMA permit signal 52, the DMA request control signal 53, and the access path control signal 54. The DMA request control signal 53, as described above, becomes a logical "1" signal when the 28-bit address DMA request signal 43 is detected. Hence, the selector 55 is supplied with the logical "1" signal and the selector 55 selects the output of the flip-flop 56 which is previously set by the CPU 31 to logical "0". Thereby, a logical "0" signal indicating that the address data of the master unit issuing the DMA request is 28-bits wide is supplied, through the selector 55, to the address data adding circuit 50 as the address data width signal 70.

Now, reference is made to FIG. 5. In the address data adding circuit 50, the address data width signal 70 of logical "0" is applied to the selector 74 and the NAND gate 72. The selector 74 in response to the logical "0" signal selects the signal from the decoder 75. The decoder 75 decodes the address data on the high-order address bus 40 and outputs a logical "0" signal when every bit of the address data (M23 to M27) is logical "0". This logical "0" signal from the decoder 75 is applied through the selector 74 and the NOT gate 73 to the NAND gate 71. Upon receipt of the logical "1" signal from the NOT gate 73, the NAND gate 71 which has been supplied with the DMA permit signal 52 outputs the enable signal 66 and at the same time enables the driver gate 78. Thereby, the address data (MF'0 to MF'8: FIG. 8) previously stored in the flip-flop group 76 is delivered onto the memory bus 38 as the high-order 9-bit address data (MA23 to MA31) on the memory bus 38. The enable signal 66 in the meantime enables the driver gate 65 (FIG. 4) and thereby allows the low-order 23-bit address data (M0 to M22) of the 28-bit address on the low-order address bus 41 from the master unit 34 to be transferred to the memory bus 38 as the low-order 23-bit address data (MA0 to MA22). Thereby, as shown in FIG. 8, the 32-bit address data 82 (MA0 to MA31) corresponding to the 28-bit address data 85 (M0 to M22, M23 to M27) from the 28-bit address master unit 34 is formed on the memory bus 38. Thus, the master unit 34 using 28-bit address is able to carry out addressing of the memory 32 using 32-bit address and thereby data transfer by the DMA between the master unit 34 and the memory 32 is made possible.

Now, address bus controlling operations for the DMA from the 28-bit address master unit 34 to the 28-bit address slave unit 36 or the 24-bit address slave unit 37 connected with the system bus 39 will be described. In these cases, the flip-flop group 77 is not used.

With reference to FIG. 3, when the DMA to the slave unit connected with the system bus 39 is necessitated, the 28-bit address master unit 34 delivers 28-bit address data onto the high-order address bus 40 and the low-order address bus 41. Further, the 24th bit is directly sent to the 24-bit address slave unit 37 through the signal line 41a. The address data delivered onto the high-order address bus 40 is set to the value identifying the area in the 28-bit address space allotted to either the 28-bit address slave unit 36 or the 24-bit address slave unit 37 that is the object unit of the DMA. The 28-bit address master unit 34 also sends the 28-bit address request signal 43 to the bus control circuit 33.

With reference to FIG. 4 and FIG. 5, the access request handling circuit 49 generates the DMA permit signal 52, the DMA request signal 53, and the access path control signal 54. In the same manner as in the case of the DMA to the memory 32, the selector 55 delivers the address data width signal 70 of logical "0" to the address data adding circuit 50. In the address data adding circuit 50, the selector 74 in response to the address data width signal 70 of logical "0" selects the output of the decoder 75. Here, however, the output of the selector 75 is logical "1", regardless of which slave unit a DMA request is made. This is because the address data on the high-order address bus 40 does not indicate the DMA window space of the memory bus 38. Hence, the NAND gate 71 does not generate an enable signal. Since the address data width signal 70 is of logical "0", the NAND gate 72 also does not generate an enable signal. As a result, neither of the flip-flop groups 76 and 77 delivers the address data. The decoder 63 decodes the address data on the high-order address bus 40 and, when the 24-bit address slave unit 37 is identified, generates an output of logical "1", and when not identified it, generates an output of logical "0". Hence, when the 24-bit address slave unit 37 is identified, the AND gate 62 delivers the 24-bit address access control signal 48 to the 24-bit address slave unit 37, and when not, the AND gate 60 delivers the 28-bit address access control signal 47 to the 28-bit address slave unit 36.

As apparent from the foregoing description, the bus control circuit 33 dynamically compensates for mismatches between address data widths of the units 31, 32, and 34 to 37 of different address data widths connected with the memory bus 38 and the system bus 39 having different address bus widths and thereby achieves data transfers between these units.

Figure 9:
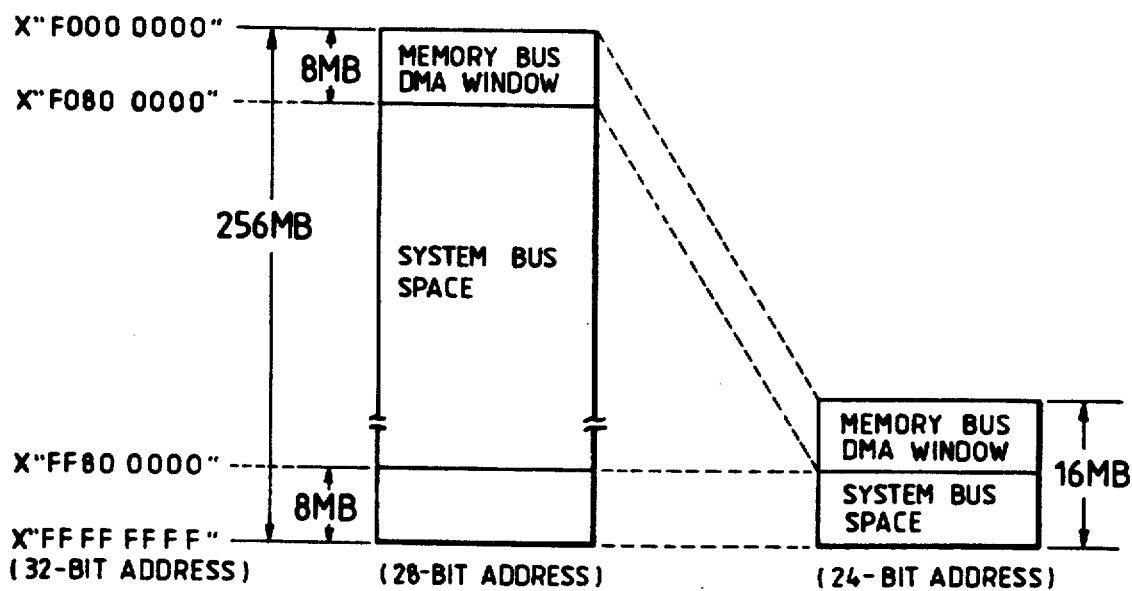
FIG. 9 illustrates mapping of system bus address spaces.

Allotment of address spaces and setting of address data in the flip-flop groups 76 and 77 will now be described. FIG. 9 shows an example of mapping or correspondence between the 32-bit address space of the memory bus 38, the 28-bit address space of the system bus 39, and the 24-bit address space of the 24-bit address units 35 and 37. The area of 256 MB from the maximum address X"FFFF FFFF" (hexadecimal) to X"F000 0000" in the 32-bit (4 GB) address space of the memory bus 38 is mapped onto the 28-bit address space of the system bus 39. The portion of 8 MB from the minimum address X"F000 0000" to X"F07F FFFF" of this area is allotted to the memory bus DMA window space used for the DMA from the 28-bit address master unit 34 or the 24-bit address master unit 35 to the memory 32. The remaining portion (address X"F080 0000" to X"FFFF FFFF") is used as the system bus space for accessing the slave units 36 and 37 connected with the system bus 39. The area of 8 MB from the address X"FF80 0000" to X"FFFF FFFF", in particular, is mapped onto the area of 8 MB ending at the maximum address of the 24-bit (16 MB) address space of the 24-bit address units 35 and 37 and used for accessing the 24-bit address slave unit 37. The remaining 8 MB area in the 24-bit address space is mapped onto the aforesaid memory bus DMA window space and used for the DMA from the 24-bit address master unit 35 to the memory 32.

According to this mapping, the 9-bit address data MF8 to MF0 (FIG. 6) and MF'8 to MF'0 (FIG. 8) supplied by the flip-flop group 76 when the 28-bit address master unit 34 and the 24-bit address master unit 35 access the memory bus DMA window space are both "111100000". Similarly, the 5-bit address data SF4 to SF0 (FIG. 7) supplied by the flip-flop group 77 is "11111" when the 24-bit address master unit 35 accesses the 24-bit address slave unit 37, but when it accesses the 28-bit address slave unit 36, this 5-bit address data may take any desired bit pattern other than "11111" and "00000".

The bit pattern of the 9-bit address data supplied by the flip-flop group 76 changes when the allotment of the memory bus DMA window space changes. Further, the memory bus DMA window space for the 28-bit address master unit 34 may be different from that for the 24-bit address master unit 35. The address data supplied by the flip-flop group 76 in this case changes depending on which of the master units has issued the DMA request to the memory 32.

If it is the sole object to compensate for the mismatch between address data widths, adding address bits of the number equal to the difference in address data width will be enough. For example, for the DMA of the 28-bit address master unit 34 to the memory 32, addition of four bits will be enough and, for the DMA of the 24-bit address master unit 35 to the memory 32, addition of eight bits will be enough. However, in the above described embodiments, the flip-flop groups 16, 17, 76, and 77 further supply the data replacing the bus identifying portion (M23 in FIG. 6 and FIG. 7 and M23 to M27 in FIG. 8). This permits much freer mapping between address spaces and thereby brings about a high degree of flexibility in addressing.

In order that a plurality of DMA operations are performed concurrently, plural flip-flop groups 16, 17, 76, or 77 may be provided. For example, if two flip-flop groups 77 are provided, two parallel DMA operations from a first and a second 24-bit address master unit to a first and a second 28-bit address slave unit, respectively, can be performed on a time division basis.

What is claimed is:
1. An address bus control apparatus for a data processing system having a first address bus, a second address bus with a width smaller than that of said first address bus, a processor and a memory unit connected with said first address bus, and a plurality of input/output units connected with said second address bus, at least one of said plurality of input/output units being an accessing unit which accesses said memory unit or another one of said input/output units by generating bus identifying information which identifies at least one of said address buses to which the accessed memory unit or another one of said input/output units is connected and generating address information whose width is not larger than the width of said second address bus, said address bus control apparatus comprising:

signal receiving means connected with said accessing unit for receiving said bus identifying information;
first storing means for storing first predetermined address information having a width corresponding to a predetermined difference between the address information width of said accessing unit and the width of said first address bus; and
first address information transmitting means connected with said first and second address buses, said signal receiving means, and said first storing means and responsive to said bus identifying information for transmitting said first predetermined address information from said first storing means and the address information generated by said accessing unit from said second address bus, respectively, onto said first address bus when said bus identifying information identifies said first address bus.

2. The address bus control apparatus as claimed in claim 1, wherein the address information width of said accessing unit is smaller than the width of said second address bus, and said address bus control apparatus further comprises:

second storing means for storing second predetermined address information having a width corresponding to a predetermined difference between the address information width of said accessing unit and the width of said second address bus; and second address information transmitting means connected with said second address bus, said signal receiving means, and said second storing means, and responsive to said bus identifying information for transmitting said second predetermined address information from said second storing means onto said second address bus when said bus identifying information identifies said second address bus.

3. The address bus control apparatus as claimed in claim 2, wherein said bus identifying information is a portion of the address information from said accessing unit, and said first and second predetermined address information each include information for replacing said bus identifying information in said address information from the accessing unit.

4. The address bus control apparatus as claimed in claim 3, wherein said second address bus includes a first address bus portion and a second address bus portion, said accessing unit delivers said address information excluding said bus identifying information onto said first address bus portion, said second address information transmitting means transmits said second predetermined address information onto said second address bus portion, and said first address information transmitting means transmits said address information on said first address bus portion onto a corresponding portion of said first address bus.

5. The address bus control apparatus as claimed in claim 2, wherein said first and second predetermined address information are supplied to said first and second storing means, respectively, by said processor.

6. An address bus control apparatus for a data processing system including a first address bus, a second address bus with a width smaller than that of said first address bus, a processor and a memory unit connected with said first address bus, and a plurality of input/output units connected with said second address bus, said plurality of input/output units including a plurality of accessing units each of which accesses said memory unit or another one of said input/output units by generating bus identifying information which identifies an address bus with which an accessed unit connected, address information whose width is not larger than the width of said second address bus, and an access request signal, said address bus control apparatus comprising:

signal generating means connected with said accessing units and responsive to said access request signal issued by each of said accessing units for generating an address width signal which indicates the address information width of the accessing unit issuing said access request signal;

signal receiving means connected with said accessing units for receiving said bus identifying information from said accessing unit issuing said access request signal;

storing means for storing first predetermined address information having a width corresponding to a predetermined difference between the address information width of said accessing unit issuing said access request signal and the width of said first address bus, and second predetermined address information having a width corresponding to a predetermined difference between the address information width of said accessing unit issuing said access request signal and the width of said second address bus; and address information transmitting means connected with said first and second address buses, said signal generating means, said signal receiving means, and said storing means, being responsive to said address width signal and said bus identifying information for transmitting said first predetermined address informaiton and the address information generated by said accessing unit from said storing means and from said second address bus, respectively, onto said first address bus when said bus identifying informaiton identifies said first address bus, and transmitting said second predetermined address information from said storing means onto said second address bus when said bus identifying information identifies said second address bus and said address width signal indicates an address information width smaller than the width of said second address bus.

7. The address bus control apparatus as claimed in claim 6, wherein said bus identifying information is a portion of the address information from each of said accessing units and said first and second predetermined address information each include information for replacing said bus identifying information in said address information from the accessing unit.

8. The address bus control apparatus as claimed in claim 7, wherein said plurality of accessing units include a first accessing unit generating address information having a width equal to the width of said second address bus and a second accessing unit generating address information having a smaller width than the width of said second address bus, said second address bus includes a first address bus portion and a second address bus portion, said second accessing unit delivers said address information excluding said bus identifying information onto said first address bus portion, said address information transmitting means transmits said second predetermined address information onto said second address bus portion, and said address information transmitting means transmits said address information on said first address bus portion onto a corresponding portion of said first address bus.

9. The address bus control apparatus as claimed in claim 8, wherein said signal receiving means receives said bus identifying information from said first accessing unit via said second address bus portion.

10. The address bus control apparatus as claimed in claim 6, further comprising decoding means connected to said second address bus for decoding the address information thereon to generate an output which indicates the address information width of the accessed unit and signal delivering means connected to said decoding means and responsive to said output for delivering an access control signal to the input/output units accessible by address information having the width indicated by said output.

11. The address bus control apparatus as claimed in claim 6, wherein said first and second predetermined address information are supplied to said storing means from said processor.

12. An address bus control apparatus for a data processing system including a first address bus, a second address bus with a width smaller than that of said first address bus, a processor and a memory unit connected with said first address bus, and a plurality of input/output units connected with said second address bus, said plurality of input/output units including a plurality of accessing units each of which accesses said memory unit or another one of said input/output units by generating bus identifying information which identifies an address bus with which an accessed unit is connected, address information whose width is not larger than the width of said second address bus, and an access request signal, said address bus control apparatus comprising:

- signal generating means connected with said accessing units and respeonsive to said access request signal issued by each of said accessing units for generating an address width signal which indicates the address information width of the accessing unit issuing said access request signal;
- signal receiving means connected with said accessing units for receiving said bus identifying information from said accessing unit issuing said access request signals;
- storing means for storing first predetermined address information having a width corresponding to a difference between the address information width of said accessing unit issuing said access request signal and the width of said first address bus and second predetermined address information having a width corresponding to a difference between the address information width of said accessing unit issuing said access request signal and the width of said second address bus; and
- address information transmitting means connected with said first and second address buses, said signal generating means, said signal receiving means, and said storing means, being responsive to said address width signal and said bus identifying information for transmitting said first predetermined address information and the address information generated by said accessing unit from said storing means and from said second address bus, respectively, onto said first address bus when said bus identifying information identifies said first address bus, and transmitting said second predetermined address information from said storing means onto said second address bus when said bus identifying information identifies said second address bus and said address width signal indicates an address information width smaller than the width of said second address bus.

* * * * *